US009958294B2

(12) United States Patent
Cook

(10) Patent No.: US 9,958,294 B2
(45) Date of Patent: May 1, 2018

(54) ABSOLUTE POSITION ENCODER INCLUDING SCALE WITH VARYING SPATIAL CHARACTERISTIC AND UTILIZING FOURIER TRANSFORM OR OTHER SIGNAL PROCESSING

(71) Applicant: Mitutoyo Corporation, Kanagawa-ken (JP)

(72) Inventor: Ted Staton Cook, Kirkland, WA (US)

(73) Assignee: Mitutoyo Corporation, Kanagawa-ken (JP)

( * ) Notice: Subject to any disclaimer, the term of this patent is extended or adjusted under 35 U.S.C. 154(b) by 146 days.

(21) Appl. No.: 15/199,723

(22) Filed: Jun. 30, 2016

(65) Prior Publication Data

US 2018/0003524 A1  Jan. 4, 2018

(51) Int. Cl.
  *G01D 5/14* (2006.01)
  *G01D 5/20* (2006.01)

(52) U.S. Cl.
  CPC ...................................... *G01D 5/20* (2013.01)

(58) Field of Classification Search
  CPC ........ G01D 5/12–5/2417; G01B 3/002; G01B 3/18; G01B 3/20; G01B 3/205; G01B 5/14
  See application file for complete search history.

(56) References Cited

U.S. PATENT DOCUMENTS

| | | |
|---|---|---|
| 3,882,482 A | 5/1975 | Green et al. |
| 4,109,389 A | 8/1978 | Balcom et al. |
| 4,414,754 A | 11/1983 | Lapeyre |
| 4,964,727 A | 10/1990 | Huggins |
| 5,010,655 A | 4/1991 | Rieder et al. |
| 5,093,801 A | 3/1992 | White et al. |
| 5,237,391 A | 8/1993 | Huggins |
| 5,279,044 A | 1/1994 | Bremer |
| 5,442,166 A | 8/1995 | Hollmann |
| 5,731,707 A * | 3/1998 | Andermo ............. G01D 5/2415 324/660 |
| 5,773,820 A | 6/1998 | Osajda et al. |
| 5,841,274 A | 11/1998 | Masreliez et al. |
| 5,886,519 A | 3/1999 | Masreliez et al. |
| 5,894,678 A | 4/1999 | Masreliez et al. |
| 5,965,879 A | 10/1999 | Leviton |

(Continued)

*Primary Examiner* — Tung X Nguyen
*Assistant Examiner* — David Frederiksen
(74) *Attorney, Agent, or Firm* — Seed IP Law Group LLP

(57) ABSTRACT

An electronic absolute position encoder is provided including a scale, a detector portion and a signal processing configuration. The scale includes a first scale pattern of signal modulating elements, wherein the first scale pattern includes a spatial characteristic of the signal modulating elements which progressively changes as a function of position along a measuring axis direction and defines an absolute measuring range. The spatial characteristic includes at least one of a spatial wavelength or a spatial frequency of the signal modulating elements and is unique at each unique position in the absolute measuring range. The detector portion includes a group of sensing elements, and the signal processing configuration determines an absolute position of the sensing elements relative to the scale within the absolute measuring range. In various implementations, the signal processing configuration may utilize Fourier transform processing and/or other processing for determining the absolute position.

23 Claims, 8 Drawing Sheets

(56) References Cited

U.S. PATENT DOCUMENTS

| | | | |
|---|---|---|---|
| 5,973,494 A | 10/1999 | Masreliez et al. | |
| 6,002,250 A | 12/1999 | Masreliez et al. | |
| 6,011,389 A | 1/2000 | Masreliez et al. | |
| 6,335,618 B1 | 1/2002 | Nahum | |
| 7,376,170 B2 | 5/2008 | Scheck | |
| 7,378,839 B2* | 5/2008 | Abe | G01D 5/145 324/207.21 |
| 9,267,819 B2 | 2/2016 | Cook | |
| 9,310,175 B2* | 4/2016 | Cook | G01B 5/14 |
| 9,612,136 B1* | 4/2017 | Cook | G01D 5/34776 |
| 9,678,701 B2* | 6/2017 | Cook | G06F 3/14 |
| 9,772,202 B1* | 9/2017 | Cook | G01D 5/20 |
| 2006/0103376 A1* | 5/2006 | Ma | G01B 3/205 324/207.24 |
| 2011/0304482 A1* | 12/2011 | Kapner | G01D 5/24476 341/13 |
| 2015/0247742 A1* | 9/2015 | Cook | G01B 3/205 33/784 |
| 2016/0054154 A1* | 2/2016 | Cook | G01D 5/2066 324/207.17 |
| 2016/0123712 A1* | 5/2016 | Cook | G06F 3/14 33/819 |
| 2016/0146636 A1* | 5/2016 | Nahum | G01D 5/2053 324/207.17 |

\* cited by examiner

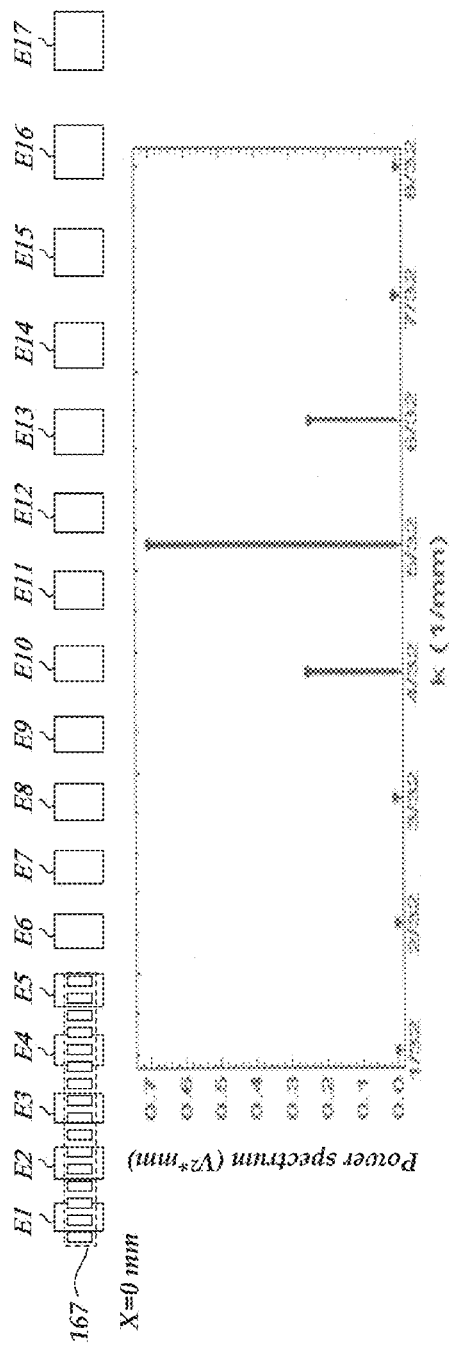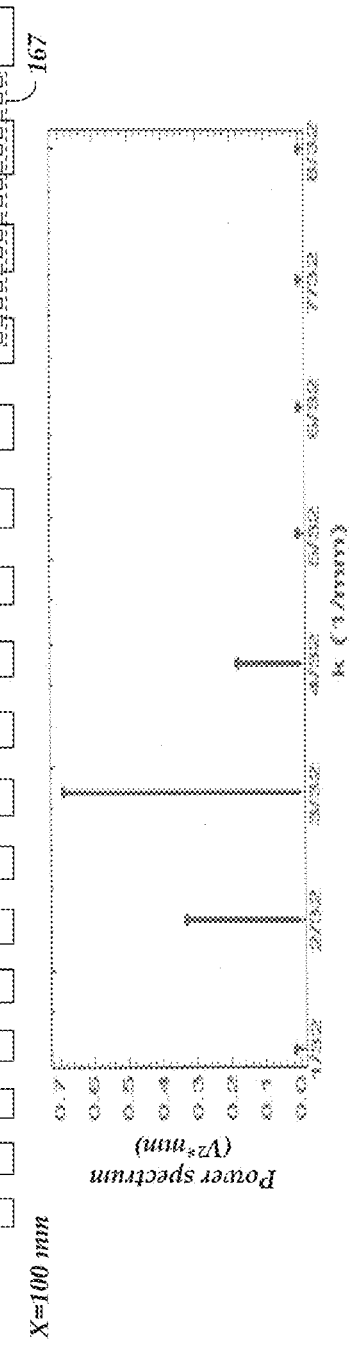
Fig. 3A.
Fig. 3B.

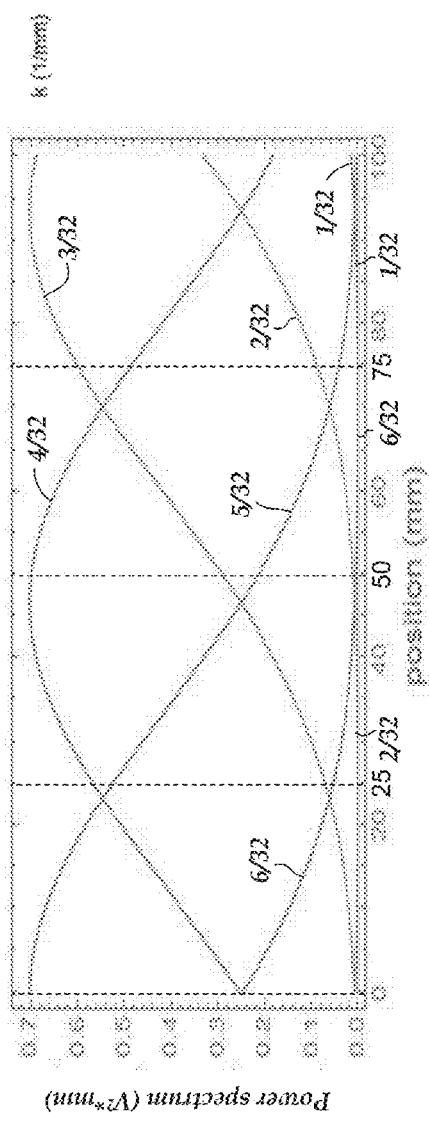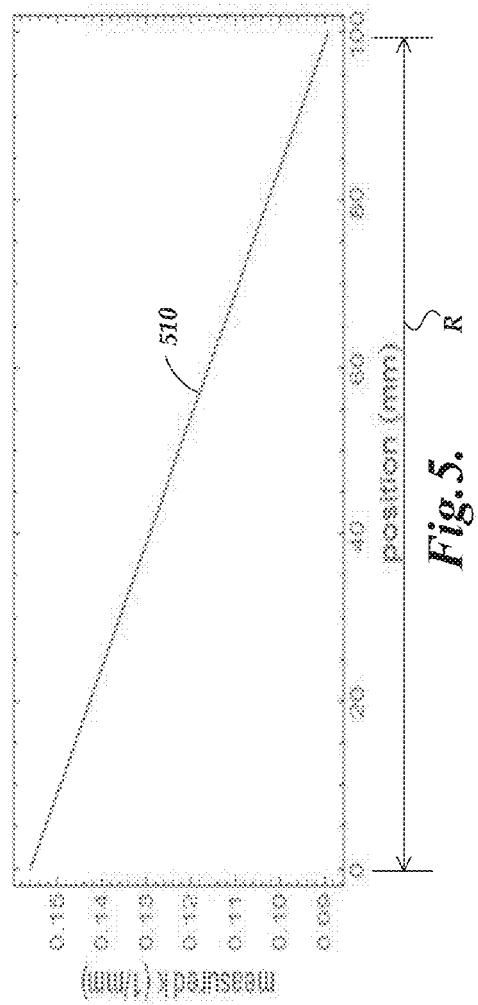
Fig. 4.
Fig. 5.

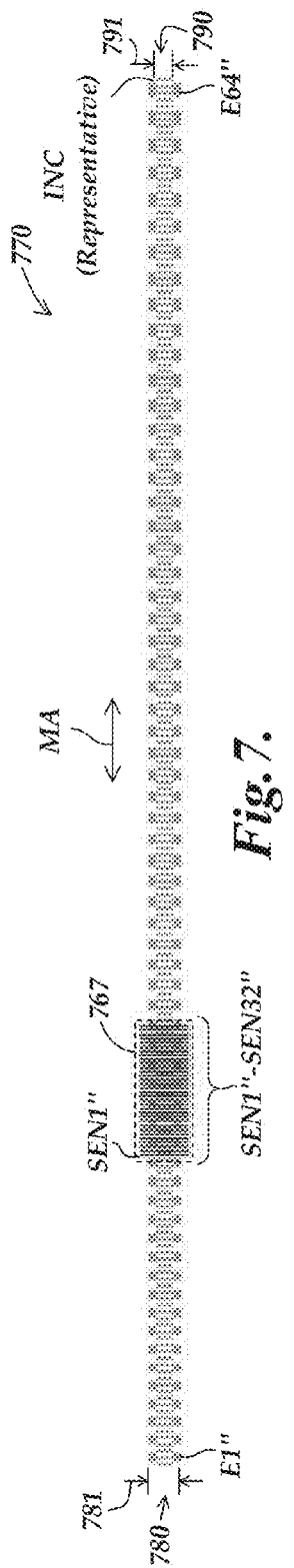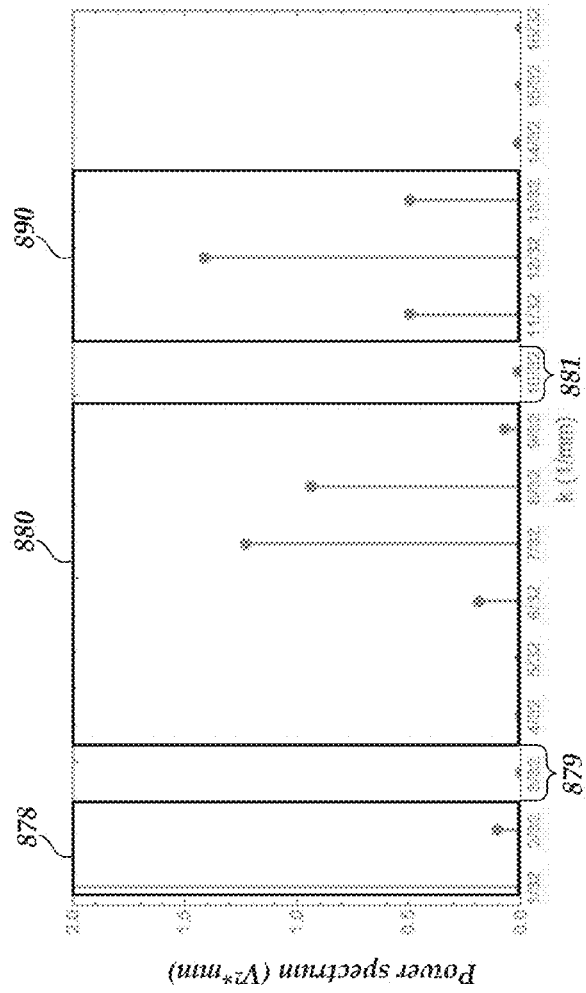
Fig. 7.
Fig. 8.

ABSOLUTE POSITION ENCODER INCLUDING SCALE WITH VARYING SPATIAL CHARACTERISTIC AND UTILIZING FOURIER TRANSFORM OR OTHER SIGNAL PROCESSING

BACKGROUND

Technical Field

This disclosure relates to precision measurement instruments, and more particularly to absolute position encoder scales and associated signal processing that may be utilized in measurement instruments such as calipers.

Description of the Related Art

Various optical, capacitive, magnetic and inductive transducers, and movement or position transducers are available. These transducers use various geometric configurations of a transmitter and a receiver in a read head to measure movement between the read head and a scale. Magnetic and inductive transducers are relatively robust to contamination, but not perfectly so.

U.S. Pat. No. 6,011,389 (the '389 patent) describes an induced current position transducer usable in high accuracy applications, U.S. Pat. No. 5,973,494 (the '494 patent) and U.S. Pat No. 6,002,250 (the '250 patent) describe incremental position inductive calipers and linear scales, including signal generating and processing circuits, and U.S. Pat. No. 5,886,519 (the '519 patent), U.S. Pat. No. 5,841,274 (the '274 patent), and U.S. Pat No. 5,894,678 (the '678 patent) describe absolute position inductive calipers and electronic tape measures using this induced current transducer. All of the foregoing are hereby incorporated herein by reference in their entireties. As described in these patents, an induced current transducer may be manufactured using printed circuit board technology and is largely immune to contamination.

The transducers outlined above may be implemented as either incremental or absolute position encoders. Incremental position encoders determine the displacement of a read head relative to a scale by accumulating incremental units of displacement, starting from an initial point along the scale. In contrast, absolute position encoders provide a unique output signal, or combination of signals, at each position along a scale. They do not require continuous power for constantly recording accumulation of incremental displacements in order to identify a position. Thus, absolute position encoders allow power conservation and are preferred for low power applications (e.g., handheld calipers).

In addition to the '519, 274, and '678 patents described above for the absolute induced current transducer, U.S. Pat. Nos. 3,882,482, 5,965,879, 5,279,044, 5,237,391, 5,442,166, 4,964,727, 4,414,754, 4,109,389, 5,773,820 and 5,010,655, 6,335,618, and 9,267,819 disclose various encoder configurations and/or signal processing techniques relevant to absolute encoders, and are each hereby incorporated herein by reference in their entirety. However, the disclosed systems are limited in their ability to provide combinations of features desired by users, such as combinations of compact size, high resolution, cost, robustness to contamination, robustness to unintended gap variations introduced between the read head and the scale, etc. Configurations of absolute encoders that provide improved combinations would be desirable.

BRIEF SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

An electronic absolute position encoder is provided including a scale, a detector portion and a signal processing configuration. The scale extends along the measuring axis direction and includes a first scale pattern of signal modulating elements. The first scale pattern includes a spatial characteristic of the signal modulating elements that progressively changes as a function of position along the measuring axis direction and defines an absolute measuring range. The spatial characteristic includes at least one of a spatial wavelength or a spatial frequency of the signal modulating elements and is unique at each unique position in the absolute measuring range. This is not to be confused with a progressively changing "spatial duty cycle" of signal modulating elements along an absolute measuring range, which is known to provide a progressively changing signal amplitude or offset of a spatially periodic signal. The detector portion includes a group of sensing elements arranged along the measuring axis direction. The sensing elements are configured to provide detector signals which respond to adjacent signal modulating elements of the scale. The signal processing configuration determines an absolute position of the sensing elements relative to the scale within the absolute measuring range based on the detector signals provided by the detector portion. In various implementations, the signal processing configuration may utilize Fourier transform processing (e.g., utilizing a fast Fourier transform) and/or other processing for determining the absolute position.

BRIEF DESCRIPTION OF THE DRAWINGS

FIGS. 3A and 3B are diagrams illustrating different processing signals that result from the detector portion being at two different locations along the scale pattern of FIG. 2.

FIG. 4 is a diagram illustrating ranges of processing signals that result from the detector portion of FIG. 2 moving over an absolute measurement range.

FIG. 5 is a diagram illustrating how a spatial frequency that is determined according to the processing signals of FIG. 4 varies over an absolute measurement range.

FIG. 7 is a plan view diagram illustrating a third exemplary implementation of a scale pattern and a detector portion.

FIG. 8 is a diagram illustrating processing signals that result from the detector portion being at a location along the scale pattern of FIG. 7.

DETAILED DESCRIPTION

Figure 1:
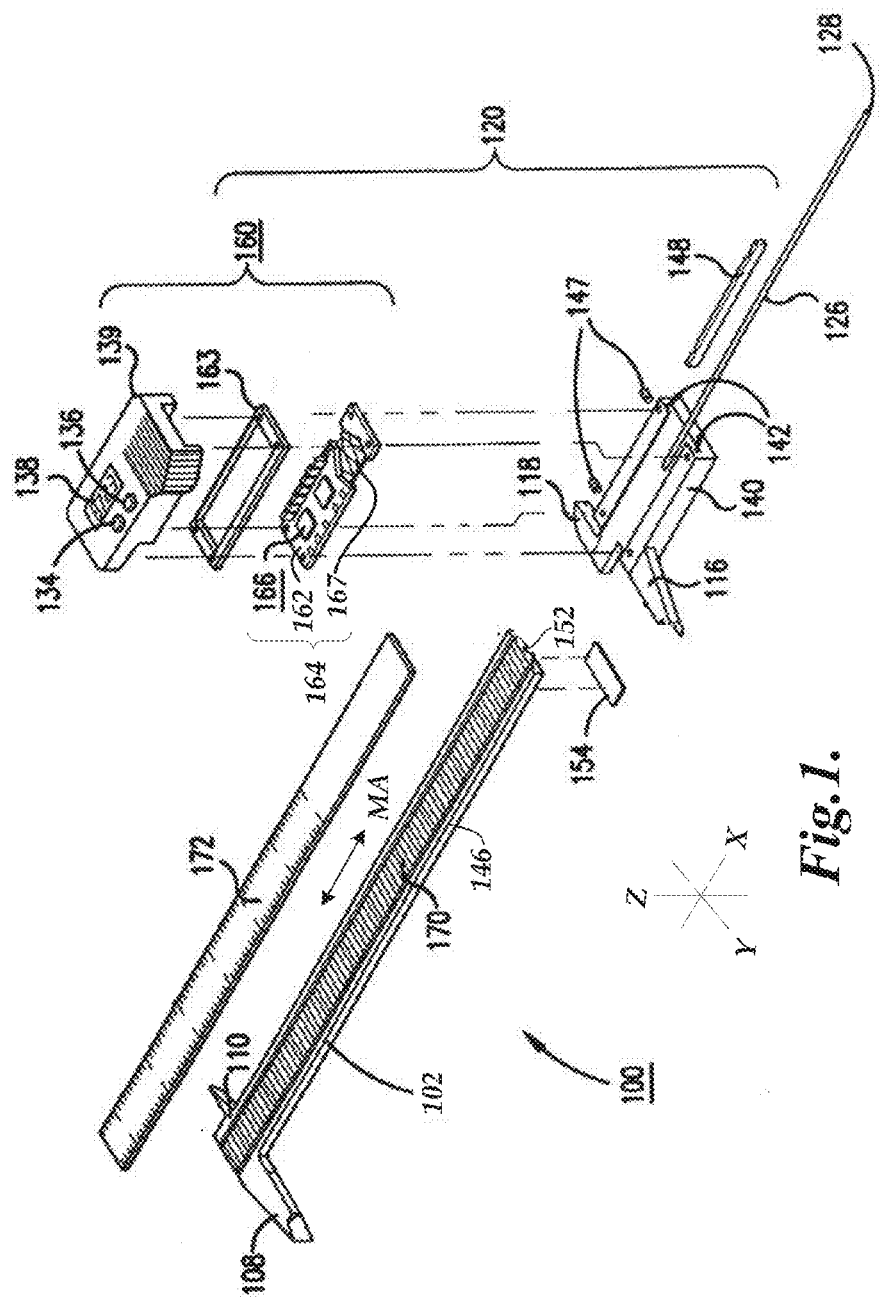
FIG. 1 is an exploded isometric view diagram of a hand tool type caliper including a scale with a scale pattern and a detector portion.

FIG. 1 is an exploded isometric view diagram of a hand tool type caliper 100 including a scale member 102 having a spar of roughly rectangular cross-section including a scale 170, and slider assembly 120. As further described with respect to FIG. 2, the scale 170 may extend along the measuring axis direction MA (e.g., the X axis) and may include a scale pattern 180 of signal modulating elements. A known type of cover layer 172 (e.g., 100 µm thick) may cover the scale 170. Jaws 108 and 110 near a first end of the scale member 102 and movable jaws 116 and 118 on the slider assembly 120 are used to measure dimensions of objects in a known manner. The slider assembly 120 may optionally include a depth bar 126, restrained in a depth bar groove 152 under the scale member 102, by an end stop 154. The depth bar engagement end 128 may extend into a hole to measure its depth. A cover 139 of the slider assembly 120 may include on/off switch 134 and zero-setting switch 136 and a measurement display 138. A base 140 of the slider assembly 120 includes a guiding edge 142 which contacts a side edge 146 of the scale member 102, and screws 147 bias a resilient pressure bar 148 against a mating edge of the scale member 102 to ensure proper alignment for measuring, and for moving a read head portion 164 relative to the scale 170.

A pickoff assembly 160 mounted on the base 140 holds the read head portion 164 which, in this implementation, includes substrate 162 (e.g., a printed circuit board) that carries a detector portion 167 including a group of sensing elements (e.g., a field generating and sensing winding configuration) arranged along the measuring axis direction MA, and a signal processing configuration (e.g., control circuit) 166. A resilient seal 163 may be compressed between the cover 139 and the substrate 162 to exclude contamination from the circuitry and connections. The detector portion 167 may be covered by an insulative coating.

In one specific illustrative example, the detector portion 167 may be arranged parallel with and facing the scale 170 separated by a gap on the order of 0.5 mm along the depth (Z) direction. Together, the read head portion 164 and the scale 170 may form a transducer. In one implementation, the transducer may be an eddy current transducer which operates by generating changing magnetic fields, wherein the changing magnetic fields induce circulating currents, known as eddy currents, in some of the signal modulating elements of the scale pattern 180 that are placed within the changing magnetic field, as will be described in more detail below.

Figure 2:
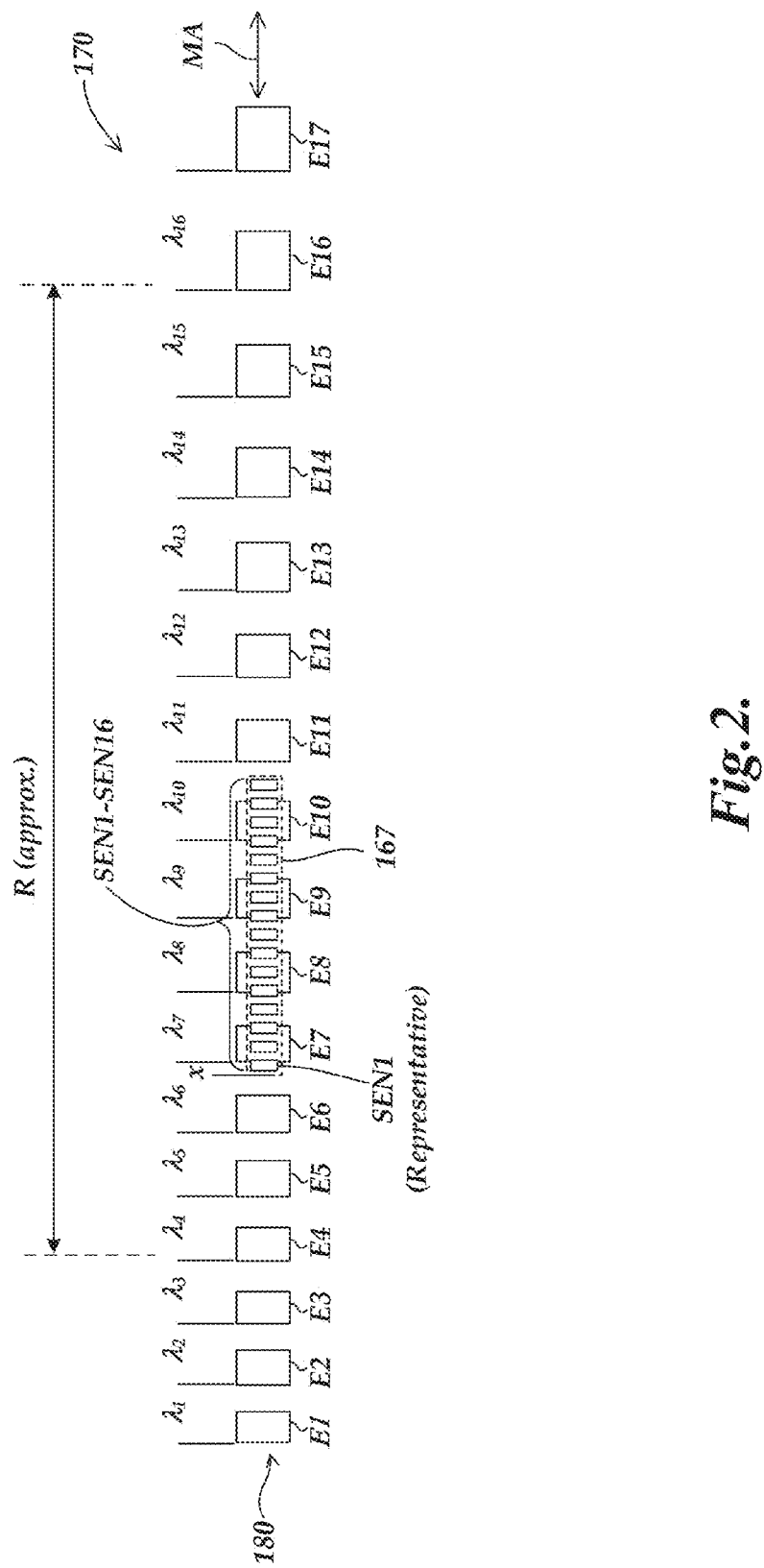
FIG. 2 is a plan view diagram illustrating a first exemplary implementation of a scale pattern and a detector portion usable in a device such as that of FIG. 1.

FIG. 2 is a plan view diagram of a first exemplary implementation usable as the detector portion 167 and a section of the scale pattern 180 of the scale 170 in a device such as that of FIG. 1. Throughout the figures of this disclosure, it should be appreciated that the x-axis dimensions of one or more signal modulating elements may be exaggerated for clarity. The drawings may generally be regarded as partly representational, partly schematic. In FIG. 2, the scale pattern 180 includes an illustrated plurality of signal modulating elements E1-E17 that are arranged along the measuring axis direction MA. The scale pattern 180 includes a spatial characteristic of the signal modulating elements E1-E17 which progressively changes as a function of position along the measuring axis direction MA. The progressively changing spatial characteristic defines an absolute measuring range, and is unique at each unique position in the absolute measuring range, as will be described in more detail below.

The detector portion 167 includes a group of sensing elements SEN1-SEN16 arranged along the measuring axis direction. The sensing elements SEN1-SEN16 are configured to provide detector signals which respond to adjacent signal modulating elements of the scale pattern 180 of the scale 170. As will be described in more detail below, a signal processing configuration (e.g., the signal processing configuration 166 of FIG. 1, or the signal processing configuration 966 of FIG. 9, etc.) may be configured to determine an absolute position of the sensing elements SEN1-SEN16 relative to the scale 170 within the absolute measuring range based on the detector signals provided by the detector portion 167.

In one specific example implementation, the spatial characteristic of the signal modulating elements E1-E17 may be characterized as including a spatial frequency $k(x)$ of the signal modulating elements which progressively changes (e.g., linearly, etc.) as a function of position along the measuring axis direction MA (e.g., the X axis), such as may be represented at least in part by:

$$k(x)=1/\lambda(x)=k_1+mx \qquad \text{(Eq. 1)}$$

In such an implementation, the nominal signal $s(x)$ (e.g., which may be representative of a chirped signal, etc.) may be represented at least in part by:

$$s(x)=C_i \cos(2\pi((k_1)(x)+(m/2)(x^2))) \qquad \text{(Eq. 2)}$$

In such an implementation, the position calculation may utilize approximately $2^n$ equally spaced sensing elements to provide the signals for the processing (e.g., utilizing fast Fourier transform or other Fourier transform processing, etc.) In such an implementation, $k(x)$ may be determined by the power-weighted average of discrete k values, as will be described in more detail below with respect to FIGS. 3A and 3B. As specific example values, in one example configuration, the spatial frequency $k(x)$ (see Equation 1) may be defined such that the spatial wavelengths for the signal modulating elements E1 and E13 may respectively correspond to $\lambda_1=6$ mm and $\lambda_{13}=10$ mm, and as illustrated the detector portion 167 may include 16 sensing elements SEN1-SEN16 with approximately 2 mm spacing between each of the sensing elements. In such an implementation, allowing for adequate scale length to accommodate the entire detector portion at each end of the absolute measuring range R, the absolute measuring range R, may be approximately R=100 mm, approximately as illustrated. Processing (e.g., utilizing fast Fourier transform or other Fourier transform processing, etc.) may be relatively efficient for $2^n$ data points (e.g., as corresponding to the 16 sensing elements of FIG. 2, or the 32 sensing elements of FIG. 7 that will be described in more detail below, etc.) In certain implementations, a windowing function (e.g., a Blackman window, etc.) may be utilized for which one or more of the sensing elements may be weighted with a value that is approximately 0, in which case fewer sensing elements may be required (e.g., if one sensing element of an otherwise 16 sensing element configuration is weighted as 0, then only 15 sensing elements ($2^n-1$) may be needed, etc.)

FIGS. 3A and 3B are diagrams illustrating different processing signals (e.g., bin values) that result from the detector portion 167 being at different locations along the scale pattern 180 of the scale 170 of FIG. 2. As noted above, in one implementation the spatial frequency $k(x)$ that is sensed by the detector portion 167 may be determined by a power-weighted average of discrete k values that are determined according to the signal processing. For example, the position calculation may utilize approximately $2^n$ equally spaced sensing elements (e.g., sensing elements SEN1-SEN16) to provide the signals for the processing (e.g., utilizing fast Fourier transform or other Fourier transform processing, etc.) In one example where a fast Fourier transform is performed on each of the detector signals from the sensing elements, the fast Fourier transform calculation provides a power value ($V^2*mm$) for each bin, for which the spatial frequency k(x) is determined by a power-weighted average of the discrete k values.

In FIG. 3A, for a position of the detector portion 167 which corresponds to X=0 mm along the scale pattern 180 of the scale 170, corresponding bin values are illustrated (e.g., with the largest value in the 5/32 bin, and other intermediate values in the 4/32 and 6/32 bins, etc.) In FIG. 3B, for a position of the detector portion 167 which corresponds to X=100 mm along the scale pattern 180 of the scale 170, corresponding bin values are illustrated (e.g., with the largest value in the 3/32 bin, and other intermediate values in the 2/32 and 4/32 bins, etc.) As noted above, in accordance with this processing (e.g., utilizing the fast Fourier transform) and the resulting discrete k values, the spatial frequency k(x) that is sensed by the detector portion 167 may be determined by a power-weighted average of these discrete k values. These and other spatial frequencies k(x) and corresponding bin values for position calculations occurring along the range from X=0 to X=100 (e.g., between the positions illustrated in FIGS. 3A and 3B) will be described in more detail below with respect to FIGS. 4 and 5.

FIG. 4 is a diagram illustrating ranges of processing signals (e.g., bin values) that result from the detector portion of FIG. 2 moving over a measurement range (e.g., from X=0 to X=100). In FIG. 4, value curves for each of the 1/32, 2/32, 3/32, 4/32, 5/32 and 6/32 bins is illustrated (e.g., value curves for the 7/32 and 8/32 bins may be approximately 0 for the range shown in this example, and the 0/32 bin is not relevant to the present discussion and has been ignored in FIG. 4 and similar plots herein.) As some example values, at the position X=0, the 5/32 bin is shown to have a value of approximately 0.70, and the 4/32 and 6/32 bins are shown to have values of approximately 0.25 (e.g., as corresponding to the values illustrated in FIG. 3A). As some additional example values, at the position X=100, the 3/32 bin is shown to have a value of approximately 0.69, the 2/32 bin is shown to have a value of approximately 0.33, and the 4/32 bin is shown to have a value of approximately 0.18 (e.g., as corresponding to the values illustrated in FIG. 3B). In accordance with such determined bin values which vary according to known functions, a unique spatial frequency k(x) may be determined at each unique position in an absolute measuring range R (e.g., from X=0 to X=100).

FIG. 5 is a diagram illustrating how a spatial frequency k(x) that is determined according to the processing signals of FIG. 4 linearly varies over an absolute measurement range R (e.g., from X=0 to X=100). A curve 510 represents values of the spatial frequency k(x) and is shown to vary linearly over the absolute measurement range R (e.g., such as may correspond to selected values for Equation 1 as described above). As an example value, at the position X=0, the curve 510 is shown to have a value of approximately 0.156, as corresponding to a power-weighted average of the bins noted above (e.g., as corresponding to the values illustrated in FIG. 3A as described above). With respect to the specific calculations at the position X=0, it is noted that in accordance with the 4/32 and 6/32 bins having similar values and being symmetrically spaced around the 5/32 bin, that the power weighted average approximately corresponds to that of the 5/32 bin (i.e., for which 5/32=0.15625). As another example value, at the position X=100, the curve 510 is shown to have a value of approximately 0.089, as corresponding to a power-weighted average of the bins noted above (e.g., as corresponding to the values illustrated in FIG. 3B).

Figure 6A:
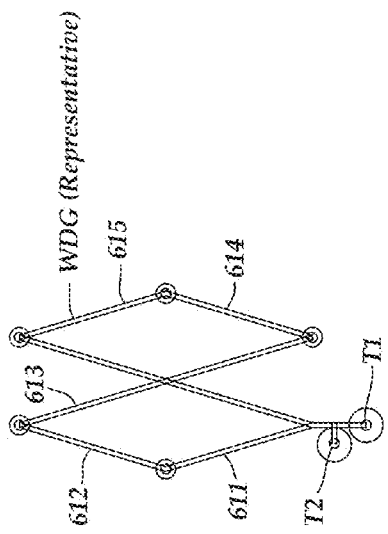
FIGS. 6A and 6B are plan view diagrams illustrating a second exemplary implementation of a scale pattern and a detector portion.
Figure 6B:
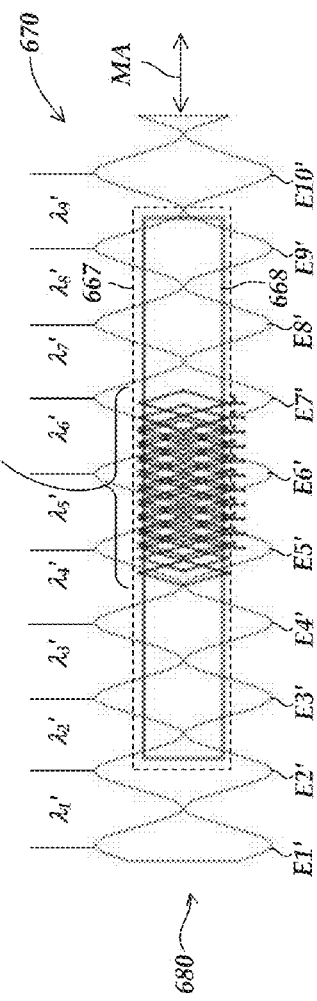

FIGS. 6A and 6B are plan view diagrams illustrating a second exemplary implementation of a detector portion 667 and a section of a scale pattern 680 of a scale 670. In FIG. 6A, a representative winding WDG is illustrated, wherein a group of windings WDG may be utilized to form a group of sensing elements, which in this embodiment includes 11 sensing elements SEN1'-SEN11' of FIG. 6B, as will be described in more detail below. The winding WDG includes terminals T1 and T2, as well as winding portions 611-616. In general, the winding WDG may operate according to known principles (e.g., for inductive encoders), such as those described in the incorporated references.

In FIG. 6B, the scale pattern 680 includes an illustrated plurality of signal modulating elements E1'-E10' that are arranged along a measuring axis direction MA. Similar to the scale pattern 180 of FIG. 1, the scale pattern 680 of FIG. 6B includes a spatial characteristic of the signal modulating elements E1'-E10' which progressively changes as a function of position along the measuring axis direction MA. The progressive change may not be perceptible in FIG. 6B, but it will be understood to be present based on this description. The progressively changing spatial characteristic defines an absolute measuring range, and is unique at each unique position in the absolute measuring range, as will be described in more detail below. In the example of FIG. 6B, the scale pattern 680 is shown to vary along the measuring axis MA according to a sinusoidal-like function with a spatial frequency that is increasing from left to right along the scale pattern and with a constant amplitude.

The detector portion 667 includes a group of 11 sensing elements SEN1'-SEN11' arranged along the measuring axis direction (e.g., as formed from a group of windings such as that of FIG. 6A), and as located relative to a coil 668 (e.g., a driving coil), which may be operated according to known techniques, such as are described in the incorporated references. The sensing elements SEN1'-SEN11' are configured to provide detector signals which respond to adjacent signal modulating elements of the scale pattern 680 of the scale 670. As described above with respect to FIG. 2, a signal processing configuration (e.g., the signal processing configuration 166 of FIG. 1, or the signal processing configuration 966 of FIG. 9, etc.) may be configured to determine an absolute position of the sensing elements SEN1'-SEN11' relative to the scale 670 within the absolute measuring range based on the detector signals provided by the detector portion 667. Similar to the example of FIG. 2, in the example of FIG. 6B the spatial characteristic of the signal modulating elements E1'-E10' may be characterized as including a spatial frequency k(x) of the signal modulating elements which progressively changes (e.g., linearly, etc.) as a function of position along the measuring axis direction MA (e.g., the X axis), such as may be represented at least in part by Equation 1 as described above. The signal processing and position determination processes for the configuration of FIG. 6B may be performed in a similar manner as those described above with respect to FIG. 2.

FIG. 7 is a plan view diagram illustrating a third exemplary implementation of a detector portion 767 and a section of a first scale pattern 780 and a second scale pattern 790 of a scale 770. The first scale pattern 780 includes an illustrated plurality of signal modulating elements E1"-E64" that are arranged along the measuring axis direction MA. Similar to the configurations described above with respect to FIGS. 2 and 6B, the first scale pattern 780 includes a spatial characteristic of the signal modulating elements E17"-E64" which progressively changes as a function of position along the measuring axis direction MA. The progressively changing spatial characteristic defines an absolute measuring range, and is unique at each unique position in the absolute measuring range. The second scale pattern 790 is characterized as an incremental track pattern which includes a plurality of signal modulating elements INC that are arranged along the measuring axis direction MA.

The first scale pattern 780 is located within a first scale track 781, and the second scale pattern 790 is located within a second scale track 791. In the example of FIG. 7, the second scale track 791 is positioned in the middle of the first scale track 781 along a direction that is traverse to the measuring axis direction MA. In various implementations, the scale 770 may thus be symmetric about a centerline, which may help reduce the roll and yaw sensitivity compared to certain side-by-side scales. In one alternative implementation (e.g., with different track widths), the first scale track 781 may be positioned in the middle of the second scale track 791. In another alternative implementation, the first and second scale tracks 781 and 791 may be separated from one another along a direction transverse to the measuring axis direction MA.

The detector portion 767 includes a group of sensing elements SEN1"-SEN32" arranged along the measuring axis direction. In various implementations, each of the sensing elements in the group of sensing elements SEN1"-SEN32" may be evenly spaced. In the example of FIG. 7, the sensing elements SEN1"-SEN32" are configured to provide detector signals which respond to adjacent signal modulating elements of both the first scale pattern 780 and the second scale pattern 790. More specifically, in various implementations, each of the sensing elements in the group of sensing elements SEN1"-SEN32" spans both the first scale pattern 780 and the second scale pattern 790 along a direction transverse to the measuring axis direction MA. As a result, the detector signals provided by the detector portion 767 simultaneously respond to adjacent signal modulating elements of both the first and second scale patterns 780 and 790. Correspondingly, a signal processing configuration (e.g., the signal processing configuration 166 of FIG. 1, or the signal processing configuration 966 of FIG. 9, etc.) processes the detector signals to determine both an absolute position of the sensing elements SEN1"-SEN32" relative to the first scale pattern 780, and an incremental position of the sensing elements SEN1"-SEN32" relative to the second scale pattern 790.

In one specific example implementation, the spatial characteristic of the signal modulating elements E1"-E64" may be characterized as including a spatial frequency k(x) of the signal modulating elements which progressively changes (e.g., linearly, etc.) as a function of position along the measuring axis direction MA (e.g., the X axis), such as may be represented at least in part by Equation 1 as described above. The signal processing and position determination processes for the configuration of FIG. 7 will be described in more detail below with respect to FIG. 8.

FIG. 8 is a diagram illustrating processing signals (e.g., bin values) that result from the detector portion 767 being at a location along the first and second scale patterns 780 and 790 of the scale 770 of FIG. 7. Similar to the processes described above with respect to FIGS. 3A and 3B, in one implementation the spatial frequency (x) that is sensed by the detector portion 767 may be determined by a power-weighted average of discrete k values that are determined according to the signal processing. For example, as noted above the position calculation may utilize approximately $2^n$ equally spaced sensing elements (e.g., sensing elements SEN1"-SEN32") to provide the signals for the processing (e.g., utilizing fast Fourier transform or other Fourier transform processing, etc.) In one example where a fast Fourier transform is performed on each of the detector signals from the sensing elements, the fast Fourier transform calculation provides a power value ($V^2$*mm) for each bin, for which the spatial frequency k(x) is determined by a power-weighted average of the discrete k values.

In FIG. 8, the diagram includes an offset signal area 878, an absolute signal area 880, and an incremental signal area 890. The offset signal area 878 is separated by a spacing 879 from the absolute signal area 880, which is separated by a spacing 881 from the incremental signal area 890. As shown in FIG. 8, for the illustrated position of the detector portion 767 along the scale pattern 780 of the scale 770, bin values corresponding to the first scale pattern 780 are illustrated in the absolute signal area 880 (e.g., with the largest value in the 7/32 bin, the second largest value in the 8/32 bin, and smaller values in the 6/32 and 9/32 bins, etc.) Bin values corresponding to the second scale pattern 790 are illustrated in the incremental signal area 890 (e.g., with the largest value in the 12/32 bin, and other intermediate values in the 11/32 and 13/32 bins).

With respect to the position determination relative to the first scale pattern 780, in accordance with the processing (e.g., such as that described above utilizing the fast Fourier transform) and the resulting discrete k values, the spatial frequency k(x) that is sensed by the detector portion 767 may be determined by a power-weighted average of the corresponding discrete k values. These and other spatial frequencies k(x) and corresponding bin values for position calculations occurring along a measurement range of the first scale pattern 780 may be calculated utilizing processes similar to those described above with respect to FIGS. 3A and 3B.

With respect to the position determination relative to the second scale pattern 790, in one implementation, the raw, complex output of a fast Fourier transform may be utilized. In various implementations, the real and imaginary values of the bin values in the incremental signal area 890 (e.g., in the 12/32 bin which corresponds to the constant spatial frequency of the scale pattern 790) provide quadrature phase that may be interpolated for fine resolution. Utilization of the second scale pattern 790 in combination with the first scale pattern 780 may thus result in greater overall resolution and accuracy for the scale 770. In various implementations, aliasing may cause signals at frequencies above the fast Fourier transform Nyquist range to reflect back in. For example, in one specific implementation, the 12/32 bin may have signals injected directly at a 12/32 frequency (e.g., a 2.66 mm wavelength), or a signal may be utilized with a 20/32 frequency (e.g., a 1.6 mm wavelength) which may be aliased to the same bin in the fast Fourier transform. Such techniques may be useful for various applications in that the quadrature phase may repeat on a shorter wavelength and the resolution may correspondingly increase. In various implementations, these characteristics may also be described according to the spatial wavelength $\lambda=32/12=2.666$ mm, or the spatial wavelength $\lambda=32/20=1.6$ mm (e.g., aliased) of the second scale pattern 790.

In various implementations, a "chaining down" between the position determination of the first scale pattern 780 (e.g., the absolute position signals) and the second scale pattern 790 (e.g., the incremental position signals, which may have better position measurement resolution) may be performed utilizing various techniques. For example, in one implementation, Equation 1 may be inverted to provide the position of the readhead from the measured k value:

$$x_{ABS}=(k-k_1)/m \qquad \text{(Eq. 3)}$$

Once determined, $x_{ABS}$ is the absolute position with an accuracy that is sufficient to indicate a specific period of the second scale pattern 790. As previously noted, the incremental position signals (which may be derived from the second scale pattern by an appropriate detector configuration, according to known methods of incremental scale measurement), may be determined with better position measurement resolution than the accuracy of $x_{ABS}$. Thus, using this "chaining down" technique, the overall absolute position measurement may be determined over the absolute measurement range of the first (absolute) scale pattern 780 with a measurement resolution as fine as that which may be obtained from the second (incremental) scale pattern 790.

In various implementations, the offset signal area 878 of FIG. 8 (i.e., including the lowest operational frequency 1/32 and 2/32 bins) may include various types of signals which may be regarded as less significant (e.g., which may not be utilized as part of the position determination process). For example, signals due to offsets, slopes, etc., may in some instances be of lower frequencies and may thus fall within the offset signal area 878. In various implementations, it may be desirable to have at least a minimum separation (e.g., as per the spacings 879 and 881) between the offset signal area 878, the absolute signal area 880 and the incremental signal area 890. With respect to the spacing 881, in various implementations it may be desirable for an incremental wavelength of the second scale pattern 790 to be separated by at least 25%, or more, from any spatial wavelength within a range of spatial wavelength included in the first scale pattern 780, such that the resulting spatial frequency signals of the two patterns may be clearly distinguished from one another by an appropriate detector portion, according to the considerations outlined above. In various implementations, the utilization of a sufficient number of sensing elements of the detector portion 767 (e.g., 32 sensing elements, etc.) may enable sufficient separation or distinction between the offset, absolute and incremental signals in the frequency space. More specifically, in various configurations, a larger number of sensing elements may enable a greater separation or distinction between the signals. Such separation or distinction may help prevent signal contamination from occurring between the respective signals.

It should be appreciated that by analogy with the foregoing chaining down description which uses an incremental scale pattern, a similar chaining down technique may be used with the previously described single absolute scale pattern 180, or the like. In particular, it will be appreciated that the determination of $x_{ABS}$ as outlined above may be used in conjunction with the previously described single absolute scale pattern 180. Once determined, $x_{ABS}$ is indicative of the absolute position with an accuracy that is sufficient to indicate a specific increment or "local period" or wavelength of the absolute scale pattern 180. We can refer to a signal measurement within this "local period" or wavelength as the fine signal and the corresponding position determination as the fine signal position for the scale pattern 180. Signals from the sensing elements (e.g., SEN1-SEN16) may be processed according to methods known to one sufficiently skilled in the art, in order to determine a fine signal position within the local period or wavelength, with better position measurement resolution and accuracy than the accuracy of $x_{ABS}$. Thus, using an appropriate detector configuration and the single scale pattern "chaining down" technique outlined here, the overall absolute position measurement may be determined over the absolute measurement range of the scale pattern 180, or the like, with a measurement resolution as fine as that which may be obtained according to the fine signal position determination. In various implementations, the absolute position determination and/or the fine signal position determination for the scale pattern 180, or the like, may be influenced by the number and spacing of the sensing elements in the detector portion, which may be configured according to need.

Generally speaking, in various implementations, certain configurations and/or techniques may be utilized to address harmonics that may occur relative to the signals. In some implementations, harmonics that are not addressed may contaminate the regions of interest, cause errors (e.g., either directly or through aliasing), etc. Small harmonics may be of particular importance in some implementations. In various implementations, utilization of a sufficient number of sensing elements (e.g., 32 sensing elements, etc.) in the detector portion 767 may allow the signals to be generated in well-separated frequency regions such that harmonics (e.g., direct and aliased) may generally skip over or otherwise not fall within the regions of interest (e.g., within the absolute signal area 880 and the incremental signal area 890). Such configurations may thus be capable of tolerating a certain amount of harmonics in the signals. Utilization of a relatively large number of sensing elements (e.g., 32 sensing elements, etc.) may be implemented in various types of encoders (e.g., optical encoders, etc.) In various implementations, a configuration utilizing fast Fourier transform processing may also be utilized with a two-pitch absolute scale (e.g., in a configuration in which the two pitches are adequately separated in frequency space).

With respect to the configurations of FIGS. 2, 6B, 7 described above, in various implementations it may be desirable to implement certain design considerations. For example, in order to achieve the desired detector signal outputs, in various implementations it may be desirable to structure the detector portion such that each of the sensing elements in the group of sensing elements is at least approximately equally spaced. In addition, it may be desirable for the group of sensing elements to span at least two spatial wavelengths of the signal modulating elements at every position along the scale (e.g., to ensure adequate sampling, in particular on a portion of the scale where the longest spatial wavelengths occur). In various implementations, in order to achieve the desired detector signal processing, it may be desirable for the group of sensing elements to include at least a minimum number of sensing elements (e.g., 12 sensing elements, 15 sensing elements, etc.)

In various implementations, the progressively changing spatial characteristic of the signal modulating elements may include one or more of a monotonically changing portion, a chirped portion, or a linearly changing spatial frequency portion, wherein the included portion may cover at least half of the absolute measuring range. In various implementations, the progressively changing spatial characteristic of the signal modulating elements may change relatively slowly over the length of the scale (e.g., changing by less than 10%, or 4%, etc., between adjacent signal modulating elements). In addition, in various implementations the progressively changing spatial characteristic of the signal modulating elements may be configured to change by enough of an amount to be detectable over the length of the scale (e.g., changing by at least 1%, or 2%, etc., between adjacent signal modulating elements).

Figure 9:
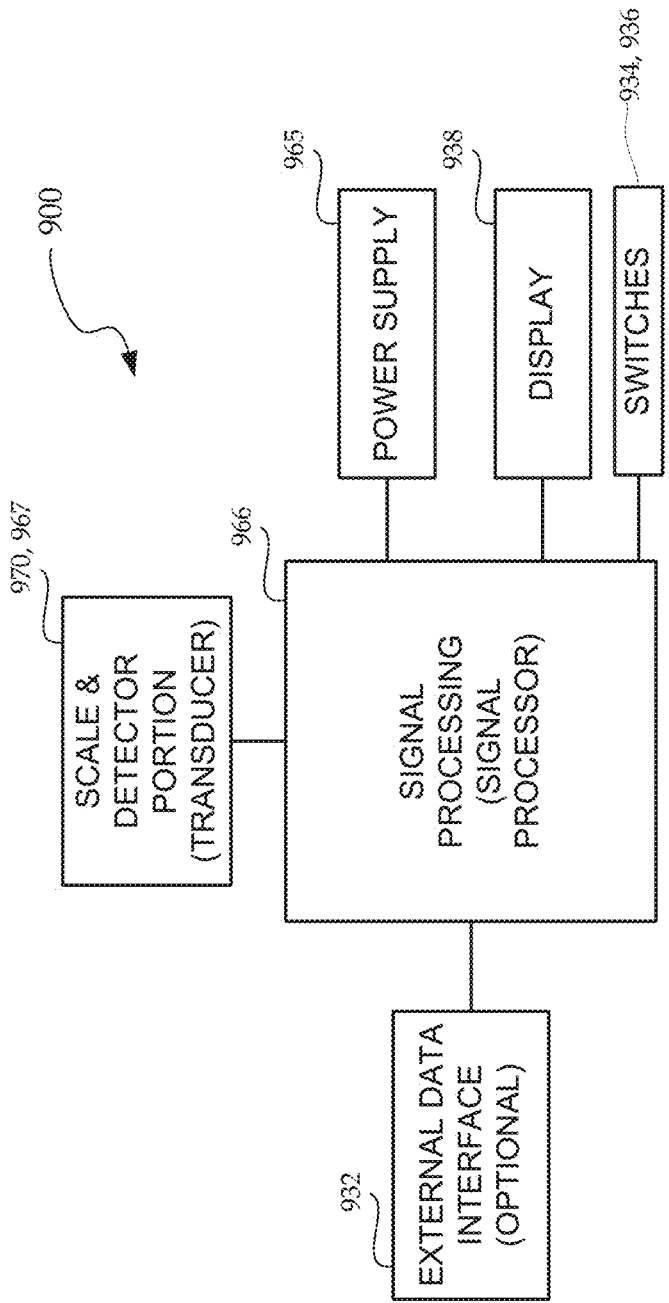
FIG. 9 is a block diagram illustrating one exemplary implementation of components of an electronic absolute position encoder.

FIG. 9 is a block diagram illustrating one exemplary implementation of components of an electronic absolute position encoder 900. It will be appreciated that certain numbered components 9XX of FIG. 9 may correspond to and/or have similar operations as similarly numbered components 1XX of FIG. 1, except as otherwise described below. The electronic absolute position encoder 900 includes a scale 970 and a detector portion 967, which together form a transducer. In various implementations, the scale 970 and detector portion 967 may include any of the configurations described above with respect to FIGS. 2, 6B, 7, or other configurations. The electronic absolute position encoder 900 also includes user interface features such as a display 938 and user-operable switches 934 and 936, and may additionally include a power supply 965. In various implementations, an external data interface 932 may also be included. All of these elements are coupled to a signal processing configuration 966 (or signal processing and control circuit), which may be embodied as a signal processor. The signal processing configuration 966 determines an absolute position of the sensing elements of the detector portion 967 relative to the scale 970 within an absolute measuring range based on detector signals provided by the detector portion 967.

In various implementations, the signal processing configuration 966 of FIG. 9 (and/or the signal processing configuration 166 of FIG. 1) may comprise or consist of one or more processors that execute software to perform the functions described herein. Processors include programmable general-purpose or special-purpose microprocessors, programmable controllers, application-specific integrated circuits (ASICs), programmable logic devices (PLDs), or the like, or a combination of such devices. Software may be stored in memory, such as random-access memory (RAM), read-only memory (ROM), flash memory, or the like, or a combination of such components. Software may also be stored in one or more storage devices, such as optical-based disks, flash memory devices, or any other type of non-volatile storage medium for storing data. Software may include one or more program modules that include routines, programs, objects, components, data structures, and so on that perform particular tasks or implement particular abstract data types. In distributed computing environments, the functionality of the program modules may be combined or distributed across multiple computing systems or devices and accessed via service calls, either in a wired or wireless configuration.

In various implementations, the signal processing configuration 966 may implement a windowing function operation (e.g., a Blackman window, etc.) for which one or more of the sensing elements of the detector portion 967 may be weighted with different values. In one such implementation, the group of sensing elements of the detector portion 967 may include a first set of sensing elements located on a first end of the group of sensing elements and a second set of sensing elements located on a second end of the group of sensing elements. In such an implementation, the signal processing configuration 966 may be configured to provide the windowing function operation that results in a tapering signal profile for each of the first and second sets of sensing elements. In an alternative implementation, rather than the windowing function being implemented by the signal processing configuration 966, the first and second sets of sensing elements on the opposite ends of the detector portion 967 may be configured to provide a physical windowing function that results in a tapering signal profile for each of the first and second sets of sensing elements. In various implementations, each of the first and second sets of sensing elements may include multiple sensing elements (e.g., 2 or more), or may include only a single sensing element.

Figure 10:
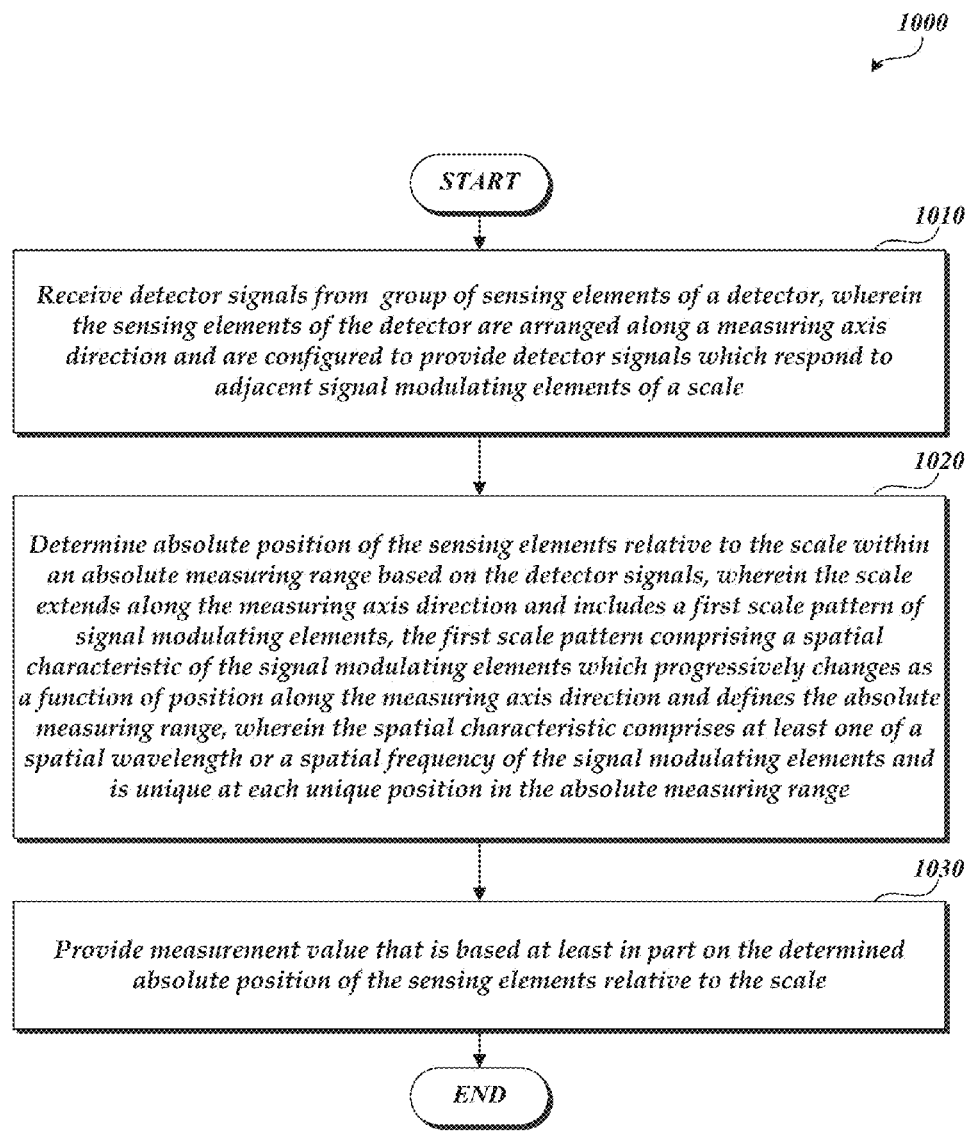
FIG. 10 is a flow diagram illustrating one exemplary implementation of a routine for determining a relative position between a detector and a scale along a measuring axis direction.

FIG. 10 is a flow diagram illustrating one exemplary implementation of a routine 1000 for determining a relative position between a detector portion and a scale along a measuring axis direction. At a block 1010, detector signals are received from a group of sensing elements of a detector, wherein the sensing elements of the detector are arranged along a measuring axis direction and are configured to provide detector signals which respond to adjacent signal modulating elements of a scale. At a block 1020, an absolute position is determined of the sensing elements relative to the scale within an absolute measuring range based on the detector signals. In various implementations, the scale extends along the measuring axis direction and includes a first scale pattern of signal modulating elements, the first scale pattern comprising a spatial characteristic of the signal modulating elements which progressively changes as a function of position along the measuring axis direction and defines the absolute measuring range. In various implementations, the spatial characteristic comprises at least one of a spatial wavelength or a spatial frequency of the signal modulating elements and is unique at each unique position in the absolute measuring range. At a block 1030, a measurement value is provided (e.g., on a display, or as output to another system or device, etc.) that is based at least in part on the determined absolute position of the sensing elements relative to the scale.

While preferred implementations of the present disclosure have been illustrated and described, numerous variations in the illustrated and described arrangements of features and sequences of operations will be apparent to one skilled in the art based on this disclosure. Various alternative forms may be used to implement the principles disclosed herein. In addition, the various implementations described above can be combined to provide further implementations. All of the U.S. patents and U.S. patent applications referred to in this specification are incorporated herein by reference, in their entirety. Aspects of the implementations can be modified, if necessary to employ concepts of the various patents and applications to provide yet further implementations.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled.

The invention claimed is:

1. An electronic absolute position encoder usable to measure a relative position between two elements along a measuring axis direction, the electronic absolute position encoder comprising:
   a scale extending along the measuring axis direction and including a first scale pattern of signal modulating elements, the first scale pattern comprising a spatial characteristic of the signal modulating elements which progressively changes as a function of position along the measuring axis direction and defines an absolute measuring range, wherein the spatial characteristic comprises at least one of a spatial wavelength or a spatial frequency of the signal modulating elements and is unique at each unique position in the absolute measuring range;

a detector portion comprising a group of sensing elements arranged along the measuring axis direction, the sensing elements configured to provide detector signals which respond to adjacent signal modulating elements of the scale; and a signal processing configuration that determines an absolute position of the sensing elements relative to the scale within the absolute measuring range based on the detector signals provided by the detector portion.

2. The encoder configuration of claim 1 wherein the signal processing configuration utilizes Fourier transform processing.

3. The encoder configuration of claim 2 wherein the Fourier transform processing comprises fast Fourier transform processing.

4. The encoder configuration of claim 1 wherein each of the sensing elements in the group of sensing elements are equally spaced.

5. The encoder configuration of claim 4 wherein the group of sensing elements spans at least two spatial wavelengths of the signal modulating elements at every position along the scale.

6. The encoder configuration of claim 1 wherein the group of sensing elements comprises a first set of sensing elements located on a first end of the group of sensing elements and a second set of sensing elements located on a second end of the group of sensing elements, and the signal processing configuration is configured to provide a windowing function operation that results in a tapering signal profile for each of the first and second sets of sensing elements.

7. The encoder configuration of claim 1 wherein the group of sensing elements comprises a first set of sensing elements located on a first end of the group of sensing elements and a second set of sensing elements located on a second end of the group of sensing elements, and the first and second sets of sensing elements are configured to provide a physical windowing function that results in a tapering signal profile for each of the first and second sets of sensing elements.

8. The encoder configuration of claim 1 wherein the progressively changing spatial characteristic includes a monotonically changing portion that covers at least half of the absolute measuring range.

9. The encoder configuration of claim 1 wherein the progressively changing spatial characteristic of the signal modulating elements changes by less than 10% between adjacent signal modulating elements.

10. The encoder configuration of claim 1 wherein the progressively changing spatial characteristic of the signal modulating elements changes by less than 4% between adjacent signal modulating elements.

11. The encoder configuration of claim 10 wherein the progressively changing spatial characteristic of the signal modulating elements changes by at least 0.1% between adjacent signal modulating elements.

12. The encoder configuration of claim 1 wherein the scale further comprises a second scale pattern which comprises an incremental track pattern of signal modulating elements.

13. The encoder configuration of claim 12 wherein an incremental spatial wavelength of the second scale pattern is separated by at least 25% from any spatial wavelength within a range of spatial wavelengths included in the first scale pattern.

14. The encoder configuration of claim 12 wherein each of the sensing elements in the group of sensing elements spans both the first scale pattern and the second scale pattern along a direction transverse to the measuring axis direction.

15. The encoder configuration of claim 14 wherein the detector signals provided by the detector portion simultaneously respond to adjacent signal modulating elements of both the first and second scale patterns and the signal processing configuration processes the signals to determine both an incremental position relative to the second scale pattern and an absolute position relative to the first scale pattern.

16. The encoder configuration of claim 12 wherein the first scale pattern and the second scale pattern are located within respective scale tracks that are separated from one another along a direction transverse to the measuring axis direction.

17. The encoder configuration of claim 12 wherein the first scale pattern is located within a first scale track and the second scale pattern is located within a second scale track, and one of the first or second scale tracks is positioned in the middle of the other along a direction that is traverse to the measuring axis direction.

18. The encoder configuration of claim 1 wherein the group of sensing elements comprises at least 12 sensing elements.

19. The encoder configuration of claim 1 wherein the group of sensing elements comprises at least 15 sensing elements.

20. The encoder configuration of claim 1 wherein the progressively changing spatial characteristic comprises a chirped portion that covers at least half of the absolute measuring range.

21. The encoder configuration of claim 1 wherein the progressively changing spatial characteristic comprises a linearly changing spatial frequency portion along at least half of the absolute measuring range.

22. A method to measure a relative position along a measuring axis direction, the method comprising:

receiving detector signals from a group of sensing elements of a detector portion, wherein the sensing elements of the detector portion are arranged along the measuring axis direction and are configured to provide detector signals which respond to adjacent signal modulating elements of a scale;

determining an absolute position of the sensing elements relative to the scale within an absolute measuring range based on the detector signals, wherein the scale extends along the measuring axis direction and includes a first scale pattern of signal modulating elements, the first scale pattern comprising a spatial characteristic of the signal modulating elements which progressively changes as a function of position along the measuring axis direction and defines an absolute measuring range, wherein the spatial characteristic comprises at least one of a spatial wavelength or a spatial frequency of the signal modulating elements and is unique at each unique position in the absolute measuring range; and providing a measurement value that is based at least in part on the determined absolute position of the sensing elements relative to the scale.

23. A measurement system, comprising:

a scale extending along a measuring axis direction and including a first scale pattern of signal modulating elements, the first scale pattern comprising a spatial characteristic of the signal modulating elements which progressively changes as a function of position along the measuring axis direction and defines an absolute measuring range, wherein the spatial characteristic comprises at least one of a spatial wavelength or a spatial frequency of the signal modulating elements and is unique at each unique position in the absolute measuring range;

a detector portion comprising a group of sensing elements arranged along the measuring axis direction, the sensing elements configured to provide detector signals which respond to adjacent signal modulating elements of the scale;

one or more processors; and a memory coupled to the one or more processors and storing program instructions that when executed by the one or more processors cause the one or more processors to at least determine an absolute position of the sensing elements relative to the scale within the absolute measuring range based on the detector signals provided by the detector portion.

\* \* \* \* \*